United States Patent
Cole

(10) Patent No.: US 6,667,022 B2
(45) Date of Patent: Dec. 23, 2003

(54) PROCESS FOR SEPARATING SYNTHESIS GAS INTO FUEL CELL QUALITY HYDROGEN AND SEQUESTRATION READY CARBON DIOXIDE

(75) Inventor: Jerald A. Cole, Long Beach, CA (US)

(73) Assignee: General Electric Co., Schenectady, NY (US)

( * ) Notice: Subject to any disclaimer, the term of this patent is extended or adjusted under 35 U.S.C. 154(b) by 345 days.

(21) Appl. No.: 09/932,563

(22) Filed: Aug. 14, 2001

(65) Prior Publication Data

US 2003/0035770 A1 Feb. 20, 2003

(51) Int. Cl.$^7$ .................. C01B 31/20; C01B 3/12; C01B 3/16
(52) U.S. Cl. .............. 423/437.1; 422/142; 422/190; 423/655; 423/656
(58) Field of Search ............. 423/437.1, 655, 423/656; 422/142, 190

(56) References Cited

U.S. PATENT DOCUMENTS

| | | | |
|---|---|---|---|
| 4,976,940 A | * 12/1990 | Paulson | 423/648.1 |
| 5,339,754 A | 8/1994 | Lyon | |
| 5,509,362 A | 4/1996 | Lyon | |
| 5,776,212 A | * 7/1998 | Leas | 422/192 |
| 5,827,496 A | 10/1998 | Lyon | |
| 5,855,631 A | * 1/1999 | Leas | 48/73 |
| 6,007,699 A | * 12/1999 | Cole | 423/652 |
| 6,113,874 A | * 9/2000 | Kobayashi | 423/648.1 |

OTHER PUBLICATIONS

Lyon et al: "Pollution Free Combustion of Coal and Other Fossil Fuels," 12 pages, *Western States Section/The Combustion Institute*, University of Washington, Seattle, Washington, Oct. 26 & 27, 1998.

Han et al: "Simultaneous Shift Reaction and Carbon Dioxide Separation for the Direct Production of Hydrogen," pp. 5875–5883, *Chemical Engineering Science*, vol. 49, No. 24B, 1994, (no month).

* cited by examiner

*Primary Examiner*—Wayne A. Langel
(74) *Attorney, Agent, or Firm*—Nixon & Vanderhye P.C.

(57) ABSTRACT

A method and apparatus for separating gas mixtures containing synthesis gas (syngas) into separate streams of wet hydrogen containing significantly reduced amounts of $CO_2$ and CO, with the $CO_2$ being "sequestration ready" and containing less than 1% fixed gases. In the preferred embodiment, a mixture of limestone and iron oxide circulates between two fluidized beds whereby one bed is fluidized with a gas containing syngas, while the other bed is fluidized with a gas containing steam and oxygen. As the fluidizing gas containing syngas passes through the bed, the $CO_2$ reacts with CaO to form $CaCO_3$. Virtually all of the CO is removed by a water gas shift reaction, forming hydrogen and $CO_2$, with the remainder being removed by reaction with the iron oxide, reducing $Fe_2O_3$ to FeO. Some hydrogen is also removed by reaction with the iron oxide, reducing $Fe_2O_3$ to FeO, while the remainder of the hydrogen passes through the fluid beds, leaving in a purified state, i.e., PEM fuel cell quality.

10 Claims, 1 Drawing Sheet

PROCESS FOR SEPARATING SYNTHESIS GAS INTO FUEL CELL QUALITY HYDROGEN AND SEQUESTRATION READY CARBON DIOXIDE

BACKGROUND OF THE INVENTION

This invention relates to a process for separating synthesis gas ("syngas") containing hydrogen, steam, $CO_2$, and CO into fuel cell quality hydrogen and "sequestration ready" carbon dioxide.

Global warming due to $CO_2$ and other Greenhouse gases is one of the major problems facing modern industrial society. One major source of $CO_2$ emissions to the atmosphere is the combustion of fossil fuels in power plants producing electricity. The problem of $CO_2$ emissions from fossil fuels could be significantly reduced, if not eliminated, by converting the fuel to a mixture containing $H_2$, $CO_2$, CO and water vapor, (syngas), separating the mixture into two streams, one containing hydrogen and the other containing $CO_2$, and then isolating the $CO_2$ and using the hydrogen to produce electricity in PEM fuel cells.

Each of the separated streams of gas must meet the purity requirements for which it is intended. Thus, hydrogen to be used in a PEM fuel cell must be free of substances that tend to "poison" the fuel cell, i.e., the hydrogen must have a CO content of less than a few ppm. The $H_2S$ content must also be very small. Since gases like $CO_2$ and $CH_4$ are not catalyst poisons, larger amounts can be tolerated. Isolating $CO_2$ normally requires compressing and cooling the gas into a liquid. Although some impurities such as $SO_2$ will readily liquefy along with the $CO_2$ and hence do not interfere with sequestration, others such as CO and $CH_4$ are not readily liquefied and interfere with the process if present in excessive amounts.

The use of CaO to remove $CO_2$ from gas streams in general, and specifically from syngas, has been described in the literature. A reference by Han and Harrison (Chemical Engineering Science, 49, 5875–5883, 1994) is typical of such prior art and describes a process in which a mixture containing $H_2$, steam, CO and $CO_2$ is passed through a bed of calcined limestone. $CO_2$ is removed by the reaction with the calcined limestone, i.e., $CaO+CO_2$ $CaCO_3$. Since calcined limestone serves as a catalyst for the water gas shift reaction, the CO and $CO_2$ are in mutual equilibrium via the reaction $CO+H_2O$ $CO_2+H_2$, and removal of the $CO_2$ also removes the CO. Thus, hydrogen gas was purified in the Hann and Harrison This 1994 reference is subject, however, to an important limitation. Although the process of purifying the hydrogen as described converts the CaO to $CaCO_3$, the article is silent with respect to the regeneration of the $CaCO_3$ back into CaO. Even though it may be within the skill of the art to recalcine the $CaCO_3$ back to CaO, the process has obvious disadvantages. Converting $CaCO_3$ to CaO is a strongly endothermic process, requiring a large input of heat energy. Typically, the purification of hydrogen is done using a packed bed of CaO. When heat is put into a packed bed by heating the walls of the bed, the sections of the bed closest to the walls tend to insulate the interior portions of the bed. Thus, once the bed is converted to $CaCO_3$, reconverting it to CaO by heating the walls of bed involves a very awkward and inefficient heat transfer situation.

In U.S. Pat. No. 5,339,754 and related U.S. Pat. Nos. 5,509,362 and 5,827,496 (incorporated herein by reference), a new method of burning fuels is disclosed using catalyst materials. The '362 teaches the use of a metal oxide catalyst that can be readily reduced. Similarly, in the '496 patent, the catalyst consists of a material that can be readily reduced when in an oxidized state and readily oxidized when in a reduced state. The fuel and air are alternately contacted with the metal oxide. The fuel reduces the metal oxide and is oxidized to $CO_2$ and water vapor. The air re-oxidizes the catalyst and becomes depleted of oxygen. Thus, combustion can be effected without the need for mixing the fuel and air prior to or during the combustion process. If means are provided whereby the $CO_2$ and water vapor and the oxygen depleted air can be directed in different directions as they leave the combustion process, then mixing can be completely avoided.

This new method of combustion is now generally referred to in the art as "unmixed combustion." The '754 patent discloses various metal oxides that can be readily reduced, including oxides of silver, copper, iron, cobalt, nickel, tungsten, manganese, molybdenum and mixtures thereof, supported on alumina. The '496 patent discloses that the readily reduced metal oxides are selected from a group consisting of nickel/nickel oxide, silver/silver oxide, copper/copper oxide, cobalt/cobalt oxide, tungsten/tungsten oxide, manganese/manganese oxide, molybdenum/molybdenum oxide, strontium sulfide/strontium sulfate, and barium sulfide/barium sulfate.

One embodiment of the '362 patent also teaches a process for steam reforming of hydrocarbons. In this process, the reaction between the hydrocarbon and steam is carried out over a nickel catalyst in the presence of CaO. While this steam reforming reaction is endothermic, it produces $CO_2$ which reacts exothermically with the CaO, making the overall reaction weakly exothermic. Thus, the need to supply the heat consumed by the steam reforming reaction by putting heat in through the reactor walls can be avoided. Eventually, the CaO is largely converted to $CaCO_3$. When this occurs, the production of hydrogen by steam reforming is halted. Air is passed through the reactor, oxidizing the nickel catalyst to nickel oxide. The ratio of nickel catalyst to $CaO/CaCO_3$ is chosen so that the oxidation of the nickel catalyst liberates enough heat to decompose the $CaCO_3$ back to CaO. When hydrocarbon and steam are again fed through the reactor, the NiO is reduced to Ni and the production of hydrogen begins again.

Another embodiment of the '362 patent, relating specifically to coal combustion, is discussed in Paper 98F-36 by R. K. Lyon and J. A. Cole at the 26 & 27 October 1998 meeting of the Western States Section of the Combustion Institute. This paper discloses a process in which coal is oxidized in a fluid bed by $SO_2$ in the presence of $Fe_2O_3$. The reaction between the coal and the $SO_2$ reduces it to elemental sulfur and other reduced sulfur species that are oxidized back to $SO_2$ by the $Fe_2O_3$. thus, the $SO_2$ acts as a catalyst, facilitating the oxidation of the coal by the $Fe_2O_3$. In this process, the $Fe_2O_3$ is reduced to FeO, which is then reoxidized back to $Fe_2O_3$ in the presence of air.

For situations in which the fuel contains sulfur, the Lyon and Cole reference teaches the existence of a "threshold" amount of $Fe_2O_2$. If the conversion of the $Fe_2O_3$ to FeO is allowed to exceed this threshold, the sulfur in the fuel forms FeS during the coal oxidation step. During the subsequent reoxidation with air of the FeO back to $Fe_2O_3$, the FeS is oxidized to $Fe_2O_3$ and $SO_2$ and emitted to the atmosphere. Keeping the $Fe_2O_3$ conversion below the threshold prevents $SO_2$ emissions.

While the Western States paper generally discloses the existence of a "threshold," the reference does not state what the threshold is, i.e., it does not teach or otherwise quantify the amount of $Fe_2O_3$ that can be reduced to FeO without exceeding the "threshold."

Taken together, the above references reflect a number of limitations in the art. The Combustion Institute paper teaches a method of producing sequestration ready $CO_2$, but does not disclose any method for producing fuel cell quality hydrogen. Nor does the paper teach any method of gas separation. The embodiment of U.S. Pat. No. 5,509,362 (which relates to steam reforming) teaches the production of hydrogen, but not the separation of mixtures containing hydrogen or the production of sequestration ready $CO_2$. The Hann and Harrison reference teaches the separation of hydrogen from gas mixtures, but not the production of sequestration ready $CO_2$.

Thus, a clear need exists in the art for a new and more efficient method of using syngas whereby gas mixtures containing hydrogen, steam, $CO_2$ and CO can be separated into fuel cell quality hydrogen and sequestration ready $CO_2$.

BRIEF DESCRIPTION OF THE INVENTION

The present invention provides a new energy efficient method of separating gas mixtures containing hydrogen, steam, $CO_2$ and CO (syngas) into fuel cell quality hydrogen and sequestration ready $CO_2$. The method according to the invention also allows sulfur compounds present in small amounts in the syngas feed to leave as $SO_2$ in the sequestration ready $CO_2$.

Specifically, the present invention concerns a new and improved method of separating gas mixtures containing synthesis gas into separate streams of wet hydrogen containing greatly reduced amounts of $CO_2$ and less than 50 ppm CO, and of sequestration ready $CO_2$ containing less than 1% fixed gases, i.e., less than 1% gases which at ambient temperature do not readily liquefy under pressure.

In one exemplary embodiment, a mixture of limestone and iron oxide circulates between two fluidized beds. One bed is fluidized with a gas containing $H_2$, steam, $CO_2$ and CO, while the other bed is fluidized with a gas containing steam and oxygen. As the fluidizing gas containing hydrogen, steam, $CO_2$, and CO, or syngas, passes through the bed, the $CO_2$ reacts with CaO, forming $CaCO_3$. Virtually all of the CO is removed by a combination of two reactions. Some CO is removed by the water gas shift reaction, forming hydrogen and $CO_2$ with the $CO_2$ being removed by reaction with the CaO. The rest of the CO is removed by reaction with the iron oxide, reducing $Fe_2O_3$ to FeO, a process that also forms $CO_2$, which is removed by reaction with the CaO.

Some of the hydrogen is also removed by reaction with the iron oxide, reducing $Fe_2O_3$ to FeO, while the remainder of the hydrogen passes through the fluid bed, leaving in a purified state for use in, for example, a PEM fuel cell. The circulation of solids between the two beds carries the $CaCO_3$ and FeO, along with unreacted CaO and $Fe_2O_3$, to the second fluid bed where the FeO is oxidized to $Fe_2O_3$, liberating heat that decomposes the $CaCO_3$ back to CaO.

Sulfur compounds in the syngas typically are present as $H_2S$. $H_2S$ reacts with FeO and CaO to form FeS and CaS, respectively. When the solids circulation carries FeS and CaS to the second fluid bed, they are oxidized, liberating $SO_2$ and forming $Fe_2O_3$ and CaO, respectively.

Accordingly, in its broadest aspects, the present invention covers a process for separating syngas into fuel cell quality hydrogen and sequestration ready carbon dioxide, comprising the steps of (1) circulating a mixture of solids comprising calcium compounds present as CaO, $Ca(OH)_2$ and $CaCO_3$ and mixtures thereof, and iron compounds present as FeO, $Fe_2O_3$, $Fe_3O_4$ and mixtures thereof, between first and second fluidized bed reactors; charging the first fluidized bed reactor with a first gas mixture containing high temperature steam, $H_2$, $CO_2$, $H_2S$ and CO; (2) charging the second fluidized bed reactor with a second gas mixture containing high temperature steam and oxygen; (3) reacting $CO_2$ present in the first gas mixture with Cao present in the first fluidized bed reactor to form $CaCO_3$; (4) reacting a portion of CO present in the first gas mixture with steam in a water gas shift reaction to form hydrogen and $CO_2$ and reacting the remaining portion of CO present in the first gas mixture with iron oxide to form FeO and $CO_2$; (5) reacting any $H_2S$ or other sulfur containing species in the first gas mixture with CaO to form CaS and $H_2O$; (6) circulating $CaCO_3$, CaS and FeO formed in the first fluidized bed reactor to the second fluidized bed reactor; (7) oxidizing FeO and CaS present in the second fluidized bed reactor to form $Fe_2O_3$, CaO and $SO_2$; (8) removing substantially pure hydrogen from the first fluid bed reactor; and finally (9) removing $CO_2$, high temperature steam and $SO_2$ from the second fluid bed reactor.

Another aspect of the present invention concerns a new apparatus for separating syngas into fuel cell quality hydrogen and sequestration ready carbon dioxide, comprising first and second fluidized bed reactors containing solids containing calcium compounds present as CaO, $Ca(OH)_2$ and $CaCO_3$ and iron compounds present as FeO, $Fe_2O_3$ and $Fe_3O_4$; first and second solids transfer lines for circulating said solids mixtures between said first and second fluidized bed reactors; a first inlet feed for charging said first fluidized bed reactor with high temperature steam and syngas; a second inlet feed for charging said second fluidized bed reactor with high temperature steam and oxygen; means for removing substantially pure hydrogen from said first fluidized bed reactor.; means for removing high temperature steam, $CO_2$ and $SO_2$ from said second fluidized bed reactor.

DETAILED DESCRIPTION OF THE INVENTION

Figure 1:
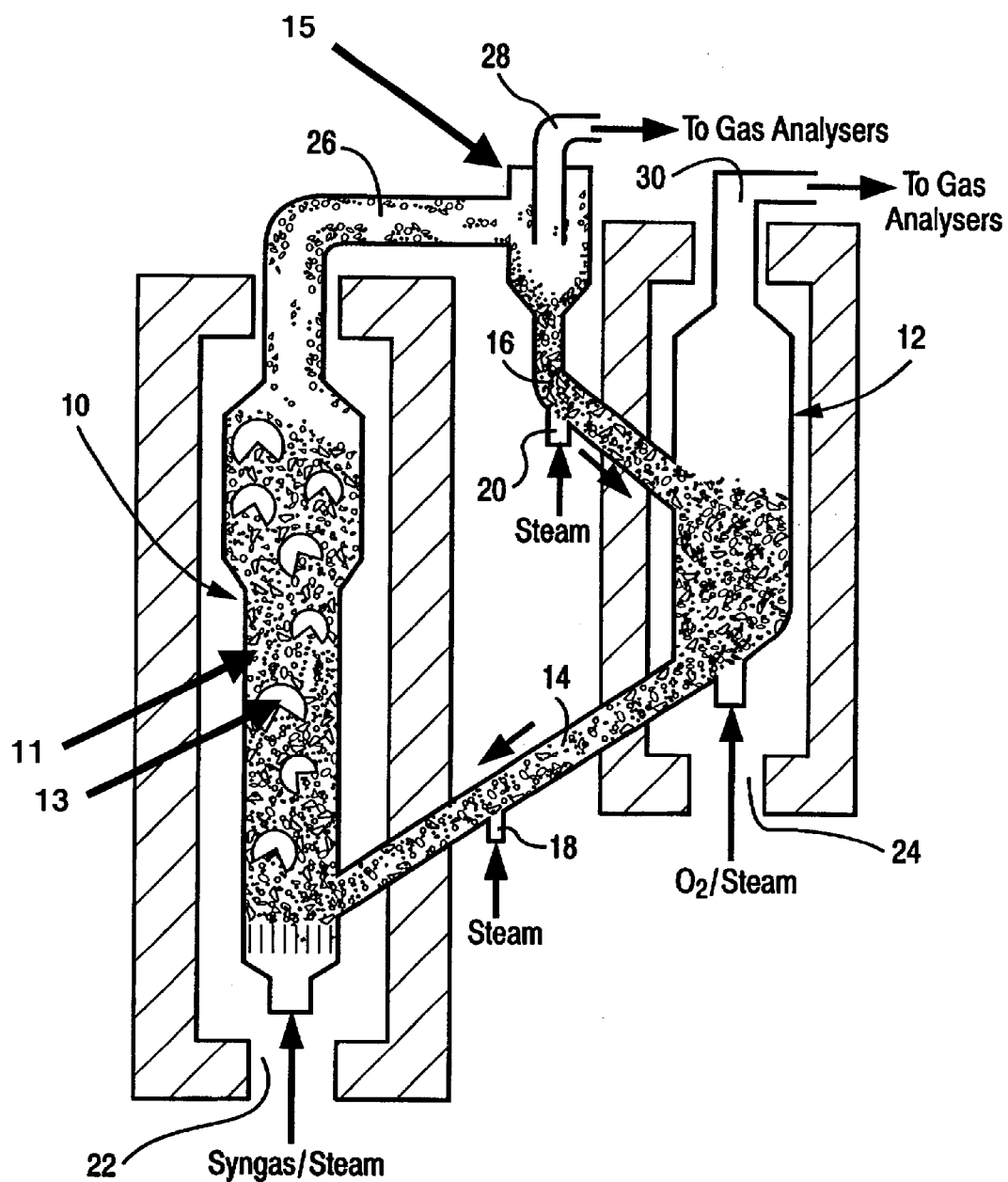
FIG. 1 is a schematic diagram of a syngas separation method and apparatus in accordance with the invention.

An exemplary embodiment of the present invention is illustrated in FIG. 1. A mixture of limestone and iron oxide circulates between two fluid beds 10, 12. The solids transfer lines (or conduits) 14, 16 between the beds are purged with steam via respective steam inlet purge lines 18, 20. One of the fluid beds 10 is fluidized with a gas containing $H_2$, steam (normally superheated), $CO_2$ and CO (syngas) via a first inlet feed 22, and preferably operates at a temperature in the range of 400° C. to 450° C. and a pressure in the range of 100 psig to 500 psig. The other fluid bed 12 is fluidized with a gas containing steam (typically superheated) and oxygen via second inlet feed 24 and preferably operates at a temperature in the range of 800° C. to 1200° C. and a pressure in the range of 100 psig to 500 psig.

The fluidizing gas containing hydrogen, steam, CO and $CO_2$ passes through bed 10 in a dense phase 11 and a bubble phase 13 as it entrains the mixture of limestone and iron oxide. As the fluidizing gas containing hydrogen, steam, CO, and $CO_2$ passes through the bed 10, the $CO_2$ reacts with CaO, forming $CaCO_3$. Virtually all of the CO is removed by a combination of two reactions. Specifically, some CO is removed by the water gas shift reaction, forming hydrogen and $CO_2$, and the latter is removed by reaction with the CaO. The remainder of the CO is removed by reaction with the iron oxide, reducing $Fe_2O_3$ to FeO, a process which also forms $CO_2$ that is removed by reaction with the CaO. Some of the hydrogen is also removed by reaction with the iron oxide, reducing $Fe_2O_3$ to FeO and the remainder passes through the fluid bed 10, exiting in a purified state via outlet 26, fluid solid separation device 15 and outlet 28. As noted above, the purified hydrogen can then be used to produce electricity in, for example, PEM fuel cells.

The circulation of solids carries the $CaCO_3$ and FeO formed in bed 10 to the second fluid bed 12 via fluid solid separation device 15 and conduit 16 where the FeO is oxidized to $Fe_2O_3$. This reaction liberates heat that decomposes the $CaCO_3$ back to CaO. The ratio of atoms of calcium (present as $CaO/CaCO_3$) to atoms of iron (present as $FeO/Fe_2O_3$) in the solids that circulate between the beds preferably ranges between 1.5 and 2. The rate of solids circulation between the beds is such that the ratio of FeO entering the second bed 12 to gaseous $O_2$ entering the bed with the fluidizing gas preferably is greater than 4 to 1, but less than 5 to 1.

Sulfur compounds in the syngas typically are present in minor amounts and predominantly as $H_2S$. In the embodiment of FIG. 1, $H_2S$ reacts in the first fluid bed 10 with FeO and CaO to form FeS and CaS, respectively. When the solids circulation carries FeS and CaS to the second fluid bed 12, they become oxidized, liberating $SO_2$ and forming $Fe_2O_3$ and CaO, respectively.

The $SO_2$ and $CO_2$ liberated from the FeS, CaS and $CaCO_3$ in reactor 12 are discharged along with steam at outlet 30. The steam contained in the gas exiting at outlet 30 can be readily condensed, leaving a stream consisting primarily of $CO_2$ and some $SO_2$ for recovery and possible sequestration.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for separating syngas into fuel cell quality hydrogen and sequestration ready carbon dioxide, comprising the steps of
    circulating a mixture of solids comprising calcium compounds present as CaO, $Ca(OH)_2$ and $CaCO_3$ and mixtures thereof, and iron compounds present as FeO, $Fe_2O_3$, $Fe_3O_4$ and mixtures thereof, between first and second fluidized bed reactors;
    charging said first fluidized bed reactor with a first gas mixture (syngas) containing high temperature steam, $H_2$, $CO_2$ and CO;
    charging said second fluidized bed reactor with a second gas mixture containing high temperature steam and oxygen;
    reacting $CO_2$ present in said first gas mixture with CaO present in said first fluidized bed reactor to form $CaCO_3$;
    reacting a portion of CO present in said first gas mixture with steam in a water gas shift reaction to form hydrogen and $CO_2$ and reacting the remaining portion of CO present in said first gas mixture with iron oxide to form FeO and $CO_2$;
    circulating $CaCO_3$ and FeO formed in said first fluidized bed reactor to said second fluidized bed reactor;
    oxidizing FeO present in said second fluidized bed reactor to form $Fe_2O_3$;
    removing substantially pure hydrogen from said first fluid bed reactor; and
    removing $CO_2$ and $SO_2$ from said second fluid bed reactor.

2. The process according to claim 1, wherein the solids in said reactor are fluidized using high temperature steam and syngas and the solids in said second reactor are fluidized using high temperature steam and oxygen.

3. The process of claim 1, wherein the temperature in said first fluidized bed reactor is between 400° C. to 450° C. and the pressure is between 100 psig and 500 psig.

4. The process of claim 1, wherein the temperature in said second fluidized bed reactor is between 800° C. to 1200° C. and the pressure is between 100 psig and 500 psig.

5. The process of claim 1, wherein the rate of solids circulation between said first and second fluidized beds is such that the ratio of FeO entering the second bed to oxygen in said second gas mixture is greater than 4 to 1 but less than 5 to 1.

6. The process of claim 1, wherein the ratio of atoms of iron present as FeO, $Fe_3O_4$ and $Fe_2O_3$ in said circulating mixture of solids is between 1.5 and 2.

7. The process of claim 1, wherein said syngas entering said first fluidized bed reactor includes $H_2S$ which reacts with FeO and CaO to form FeS and CaS.

8. The process of claim 1, wherein said first fluidized bed reactor is operated in a bubbling or entrained flow mode.

9. The process of claim 1, wherein said second fluidized bed reactor is operated in a counterflow mode.

10. The process of claim 1, wherein the solids and gases exiting said first fluidized bed reactor are separated into a gaseous stream consisting of essentially pure hydrogen and steam and a solid stream consisting principally of FeO, $Fe_2O_3$, $Fe_3O_4$, FeS, CaO, $Ca(OH)_2$, $CaCO_3$ and CaS.

* * * * *

UNITED STATES PATENT AND TRADEMARK OFFICE
CERTIFICATE OF CORRECTION

PATENT NO.     : 6,667,022 B2
DATED          : December 23, 2003
INVENTOR(S)    : Cole It is certified that error appears in the above-identified patent and that said Letters Patent is hereby corrected as shown below:

Column 1,
Line 49, insert -- experiments. -- after "Hann and Harrison".

Column 2,
Line 53, delete "thus" and insert -- Thus --.
Line 59, delete "$Fe_2O_2$." and insert -- $Fe_2O_3$. --.

Column 4,
Line 9, delete "Cao" and insert -- CaO --.

Column 6,
Line 38, insert -- calcium present as CaO, $Ca(OH)_2$ and $CaCO_3$ to atoms of -- after "ratio of atoms of".

Signed and Sealed this

Third Day of February, 2004

JON W. DUDAS
*Acting Director of the United States Patent and Trademark Office*